(12) United States Patent
Riedel et al.

(10) Patent No.: US 8,737,420 B2
(45) Date of Patent: May 27, 2014

(54) BANDWIDTH MANAGEMENT IN A POWERLINE NETWORK

(75) Inventors: Neal Riedel, Carlsbad, CA (US); Yiorgos M. Peponides, Encinitas, CA (US); James E. Petranovich, La Jolla, CA (US); Lawrence W. Yonge, Ocala, FL (US); Srinivas Katar, Gainesville, FL (US); Deepak Ayyagari, Vancouver, WA (US); Sherman L. Gavette, Camas, WA (US); Wai Chung Tony Chan, Vancouver, WA (US)

(73) Assignees: Sigma Designs Israel S.D.I. Ltd., Tel Aviv (IL); Atheros Communications, Inc., Santa Clara, CA (US); Sharp Corporation, Tenri Nara (JP)

( * ) Notice: Subject to any disclaimer, the term of this patent is extended or adjusted under 35 U.S.C. 154(b) by 757 days.

(21) Appl. No.: 11/492,505

(22) Filed: Jul. 24, 2006

(65) Prior Publication Data

US 2007/0025386 A1    Feb. 1, 2007

Related U.S. Application Data

(60) Provisional application No. 60/702,717, filed on Jul. 27, 2005, provisional application No. 60/705,720, filed on Aug. 2, 2005, provisional application No. 60/703,236, filed on Jul. 27, 2005, provisional application No. 60/703,317, filed on Jul. 27, 2005.

(51) Int. Cl.
*H04J 3/16*    (2006.01)

(52) U.S. Cl.
USPC ........................................................ 370/437

(58) Field of Classification Search
None
See application file for complete search history.

(56) References Cited

U.S. PATENT DOCUMENTS

| | | | |
|---|---|---|---|
| 6,172,615 B1 | 1/2001 | Kogure | |
| 6,172,616 B1 | 1/2001 | Johnson et al. | |
| 6,278,357 B1 | 8/2001 | Croushore et al. | |
| 6,577,231 B2 | 6/2003 | Litwin, Jr. et al. | |

(Continued)

FOREIGN PATENT DOCUMENTS

| | | |
|---|---|---|
| EP | 1065818 A1 | 1/2001 |
| EP | 1179919 | 2/2002 |

(Continued)

OTHER PUBLICATIONS

English abstract of JP 2000165304 generated online on May 22, 2013.

*Primary Examiner* — Rhonda Murphy
(74) *Attorney, Agent, or Firm* — AlphaPatent Associates Ltd.; Daniel J. Swirsky

(57) ABSTRACT

There is provided a powerline network that includes a number of stations including a central coordinator for coordinating transmissions of each of the stations. Each of the stations is configurable to generate one or more tone maps for communicating with each of the other stations in the powerline network. Each tone map includes a set of tones to be used on a communication link between two of the stations. Each tone map further includes a unique set of modulation methods for each tone. Each of the stations is further configurable to generate a default tone map for communicating with each of the other stations, where the default tone map is valid for all portions of a powerline cycle. Each of the stations is further configurable to monitor its bandwidth needs and to request additional bandwidth from the central coordinator.

18 Claims, 6 Drawing Sheets

(56) References Cited

U.S. PATENT DOCUMENTS

| | | |
|---|---|---|
| 6,587,474 B1 | 7/2003 | Griessbach |
| 6,834,091 B2 | 12/2004 | Litwin et al. |
| 6,882,634 B2 | 4/2005 | Bagchi |
| 6,888,844 B2 | 5/2005 | Mallory |
| 6,952,399 B1 | 10/2005 | Bayerl et al. |
| 6,985,072 B2 * | 1/2006 | Omidi et al. ............... 370/203 |
| 7,000,031 B2 | 2/2006 | Fischer et al. |
| 7,206,320 B2 | 4/2007 | Iwamura |
| 7,218,901 B1 * | 5/2007 | Mobley et al. ............ 455/182.2 |
| 7,307,357 B2 * | 12/2007 | Kopp ............................. 307/3 |
| 7,359,398 B2 | 4/2008 | Sugaya |
| 7,369,579 B2 * | 5/2008 | Logvinov et al. .......... 370/509 |
| 7,388,853 B2 | 6/2008 | Ptasinski et al. |
| 7,423,992 B2 * | 9/2008 | Iwamura ..................... 370/330 |
| 7,664,145 B2 | 2/2010 | Akamatsu et al. |
| 2003/0053493 A1 * | 3/2003 | Mobley et al. ............... 370/538 |
| 2003/0071721 A1 * | 4/2003 | Manis et al. ............ 340/310.03 |
| 2003/0107476 A1 * | 6/2003 | Sahinoglu et al. ...... 340/310.01 |
| 2003/0231715 A1 * | 12/2003 | Shoemake et al. ........... 375/267 |
| 2004/0122531 A1 | 6/2004 | Atsuta et al. |
| 2004/0136396 A1 | 7/2004 | Yonge et al. |
| 2004/0174851 A1 * | 9/2004 | Zalitzky et al. .............. 370/338 |
| 2004/0184427 A1 | 9/2004 | Lynch et al. |
| 2004/0208139 A1 | 10/2004 | Iwamura |
| 2004/0264557 A1 | 12/2004 | Maruyama |
| 2005/0276276 A1 | 12/2005 | Davis |
| 2006/0098606 A1 | 5/2006 | Pandey |
| 2006/0164969 A1 | 7/2006 | Malik |
| 2006/0218269 A1 * | 9/2006 | Iwamura ....................... 709/224 |
| 2006/0227729 A1 | 10/2006 | Budampati |
| 2006/0233203 A1 | 10/2006 | Iwamura |
| 2007/0025266 A1 | 2/2007 | Riedel |
| 2007/0025384 A1 | 2/2007 | Ayyagari |
| 2007/0237070 A1 * | 10/2007 | Geile et al. .................... 370/208 |
| 2008/0095126 A1 | 4/2008 | Mahany |
| 2008/0201503 A1 | 8/2008 | McKim et al. |
| 2009/0279638 A1 * | 11/2009 | Kurobe et al. ................ 375/295 |

FOREIGN PATENT DOCUMENTS

| | | |
|---|---|---|
| JP | HE08-265241 | 10/1996 |
| JP | 2000165304 | 6/2000 |
| JP | 2002-135177 | 5/2002 |
| JP | 2005-73240 | 3/2005 |
| JP | 2005079615 | 3/2005 |
| KR | WO2004/095165 A2 | 11/2004 |
| WO | WO 96/34329 | 10/1996 |
| WO | WO 01/18998 | 3/2001 |
| WO | WO0118998 | 3/2001 |
| WO | WO 02/103943 | 12/2002 |
| WO | 03100996 | 4/2003 |
| WO | WO 03/103222 | 12/2003 |
| WO | WO 2005/015841 | 2/2005 |
| WO | WO 2005/024558 A2 | 3/2005 |
| WO | WO 2005/048047 | 5/2005 |

* cited by examiner

BANDWIDTH MANAGEMENT IN A POWERLINE NETWORK

RELATED APPLICATIONS

This application claims priority from U.S. Provisional Application No. 60/702,717, filed on Jul. 27, 2005, which is hereby incorporated by reference in its entirety. The following U.S. Patent Applications are also incorporated by reference in their entireties and made part of the present application:

U.S. patent application Ser. No. 11/492,506, titled "Flexible Scheduling Of Resources In A Noisy Environment," filed concurrently with the present application;

U.S. patent application Ser. No. 11/492,487, titled "Communicating Schedule and Network information in a Powerline Network," filed concurrently with the present application;

U.S. Provisional Application No. 60/705,720, titled "Communicating in a Network that includes a Medium having Varying Transmission Characteristics, filed Aug. 2, 2005;

U.S. patent application Ser. No. 11/339,293, titled "Time Synchronization in a Network," filed Jan. 24, 2006;

U.S. patent application Ser. No. 11/337,946, titled "Communicating in a Network that includes a Medium having Varying Transmission Characteristics," filed Jan. 23, 2006;

U.S. patent application Ser. No. 11/421,155, titled "Synchronizing Channel Sharing with Neighboring Networks," filed on May 31, 2006, assigned to Sharp Laboratories of America, Inc.;

U.S. Provisional Application No. 60/703,236, titled "Method for Sharing the Channel with Neighbor Networks," filed Jul. 27, 2005;

U.S. patent application Ser. No. 11/420,432, titled "Method for Providing Requested Quality of Service," filed on May 25, 2006, assigned to Sharp Laboratories of America, Inc.;

U.S. Provisional Application No. 60/703,317, titled "Method for Providing Requested Quality of Service," filed Jul. 27, 2005; and U.S. patent application Ser. No. 11/337,963, titled "Managing Contention-Free Time Allocations in a Network," filed Jan. 23, 2006.

BACKGROUND OF THE INVENTION

1. Field of the Invention

The present invention relates generally to communication over an Ethernet-Class network and, more specifically to communication over a powerline network.

2. Background Art

The vision of the networked home has driven many a business plan, but product offerings to date have been too limited in capability or in market potential to achieve the dream. Home networking is different than networking in the workplace. The applications are different, the traffic patterns are different, and the media available to carry the data are different. Certainly home networking users will want to transfer files between their computers and share peripherals such as printers. They will want gateways to broadband access so they can share their Internet connection between multiple devices. Users will also want other services, such as voice-over-IP (VoIP), streaming media for entertainment, and support for multi-player networked games.

While some newer houses are wired with cables suitable for Ethernet, most are not. Thus, if choices for home network physical media are limited to phone wiring, wireless, and power line, there are a mixed bag of attributes.

There has been a proliferation of wireless networking and related components in recent years. However, wireless communication suffers from limited range and less than universal coverage, i.e. certain areas of the home cannot communicate with others. These issues are particularly prominent in certain types of construction that result in poor signal propagation, such as those using steel frame and brick walls. Solutions to these issues are expensive and complex, and require some technical acumen not available to the average homeowner.

Although telephone line networking may at first appear to be a solution, many households lack phone jacks at convenient locations to achieve the foreseeable benefits of home networking. For instance, some older houses may only have one phone jack located in the kitchen for use in the kitchen and other living areas (e.g. living room, family room, etc). Thus, it may be inconvenient or messy to provide network connections to remote devices. This picture is particularly unfavorable in less developed countries. Power plugs, on the other hand, are located in almost every room in the home, and some homes have multiple power outlets located on every wall of every room. The power line appears to be the most difficult medium of these three for communication, but it does have two appealing attributes. First, as with phone lines, no RF conversion hardware is needed and, thus, the cost can be low compared to wireless solutions. But more importantly, power outlets are almost everywhere someone might want to use a networked device at home.

The power line medium is a harsh environment for communication. For instance, the channel between any two outlets in a home has the transfer function of an extremely complicated transmission line network with many unterminated stubs and some having terminating loads of varying impedance. Such a network has an amplitude and phase response that varies widely with frequency. At some frequencies the transmitted signal may arrive at the receiver with relatively little loss, while at other frequencies it may be driven below the noise floor. Worse, the transfer function can change with time. This might happen because the homeowner has plugged a new device into the power line, or if some of the devices plugged into the network have time-varying impedance. As a result, the transfer function of the channel between outlet pairs may vary over a wide range. In some cases, a broad swath of bandwidth may be suitable for high quality transmission, while in other cases the channel may have a limited capacity to carry data.

Also, unplanned device usage by the homeowner can cause random variations in the transfer function of the channel between outlet pairs. As a result, the suitability of the channel's bandwidth for high quality transmission over the power line is impossible to predict before use of the channel is needed. Additionally, the bandwidth requirements of a connection between a receiver and a transmitter can change after the connection has been established, which can significantly impact Quality of Service (QoS) provided by the connection.

Since a connection between a pair of networked devices can require varying channel capacity, issues involving availability of channel bandwidth bring about concerns regarding the overall throughput of the network, QoS for each connection, monitoring of connection requirements, and adaptability of network resources. Accordingly, there is a need in the art for management and monitoring schemes that can effectively and efficiently address such concerns.

SUMMARY OF THE INVENTION

The present invention is directed to method and system for bandwidth management in a powerline network. More specifically, the invention provides a method and system for estimating channel capacity and monitoring connection requirements of networked devices to achieve effective bandwidth management in a powerline network.

In one aspect, a powerline network includes a number of stations including a central coordinator for coordinating transmissions of each of the stations. Each of the stations is configurable to generate one or more tone maps for communicating with each of the other stations in the powerline network. Each tone map includes a set of tones to be used on a communication link between two of the stations. Each tone map further includes a unique set of modulation methods for each tone. Each of the stations is further configurable to generate a default tone map for communicating with each of the other stations, where the default tone map is valid for all portions of a powerline cycle. Each of the stations is further configurable to monitor its bandwidth needs and to request additional bandwidth from the central coordinator. Each of the stations is further configurable to indicate a bandwidth need in a frame control field of a transmission, where the central coordinator is configurable to monitor the frame control field of the transmission so as to respond to the bandwidth need. Each of the tone maps can be generated as a result of a channel estimation procedure during a connection between two of the stations, where the channel estimation procedure includes measuring characteristics of a channel.

Other features and advantages of the present invention will become more readily apparent to those of ordinary skill in the art after reviewing the following detailed description and accompanying drawings.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
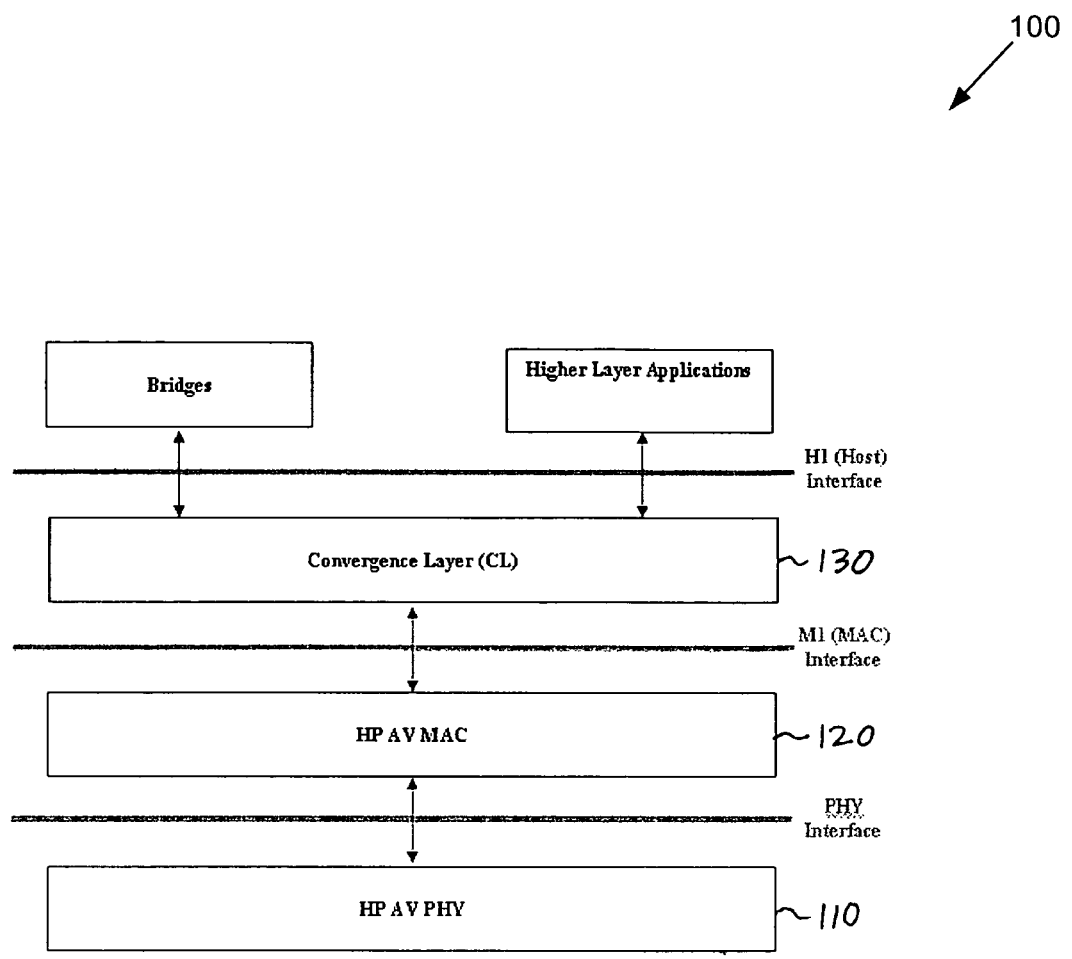
FIG. 1 illustrates an overview of a HPAV (HomePlug Audio Video) system, according to one embodiment of the present application.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

FIG. 1 illustrates an overview of HPAV (HomePlug Audio Video) system 100, according to one embodiment of the present application. As shown, HPAV system 100 includes PHY (Physical) layer 110, MAC (Media Access Control) layer 120 and convergence layer 130. When HPAV system 100 is in transmit mode, PHY layer 110 performs error-control correction, mapping into OFDM (Orthogonal Frequency Division Multiplexing) symbols, and generation of time-domain waveforms; MAC layer 120 determines the correct position of transmission, formats data frames into fixed-length entities for transmission on the channel and ensures timely and error-free delivery through Automatic Repeat Request (ARQ); and convergence layer 130 performs bridging, classification of traffic into connections, and data delivery smoothing functions. Conversely, when HPAV system 100 is in receive mode, PHY layer 110, MAC layer 120 and convergence layer 130 perform the corresponding functions in the reverse.

HPAV system 100 utilizes OFDM modulation technique due to its inherent adaptability in the presence of frequency selective channels, its resilience to narrow band interference, and its robustness to impulsive noise. Through the use of time-domain pulse shaping of the OFDM symbols, deep frequency notches can be achieved without the additional requirement of transmit notch filters. HPAV system 100 employs 1155 carriers, in the range from 1.80 MHz to 30.00 MHz.

Figure 2A:
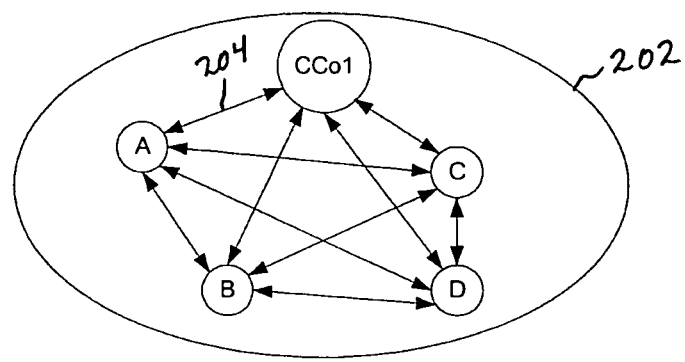
FIG. 2A illustrates a diagram of an exemplary powerline network configuration for the HPAV system in FIG. 1.

FIG. 2A illustrates an exemplary Audio Video Logical Network (AVLN) for HPAV system 100 in FIG. 1. An AVLN comprises a set of stations that have the same Network Membership Key (NMK). In an AVLN, which is also generally referred to as a "powerline network" in the present application, one of the stations becomes the Central Coordinator (CCo), which is responsible for coordinating the transmissions of all of the stations in the network, in order to achieve maximum overall network throughput as well as good QoS for each connection. The CCo is also responsible for authenticating stations that wish to join the network, managing encryption keys, and coordinating sharing of resources with neighbor networks. A CCo can either be preconfigured as such or be automatically selected through a specified selection procedure; however, only one station in an AVLN can function as a Central Coordinator (CCo) at one time. It is noted that the stations in an AVLN (i.e. a powerline network) can communicate via a powerline (i.e. an AC line).

As shown in FIG. 2A, AVLN 202 includes stations A, B, C, and D and CCo1. The Physical Network (PhyNet) of a given station is the set of stations that can physically communicate with the station—at least at the level of Frame Control (FC) and ROBO (robust) mode. A PhyNet is relative to a given station, and it is possible for PhyNets of physically close-by stations to be distinct. In the present application, it is noted that a double arrow line, such as double arrow line 204 in FIG. 2A, indicates an ability for two stations, such as station A and CCo1, to communicate on the PHY level. Also shown in FIG. 2A, all stations can communicate with each other and, consequently, the PhyNet of all stations is the same set {A, B, C, D, CCo1}, as shown in Table 1. Two stations belonging to an AVLN can communicate with each other if they belong to each other's PhyNet. Further shown in FIG. 2A, AVLN 202 coincides with the PhyNet of each station in AVLN 202.

TABLE 1

Figure 2B:
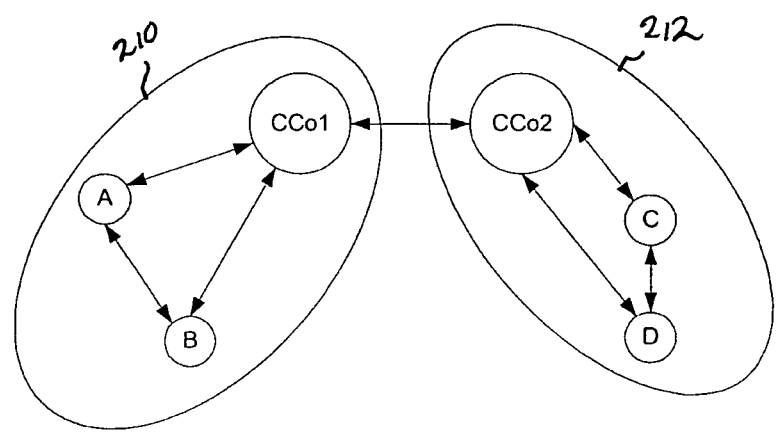
FIG. 2B illustrates a diagram of another exemplary powerline network configuration for the HPAV system in FIG. 1.
Figure 2C:
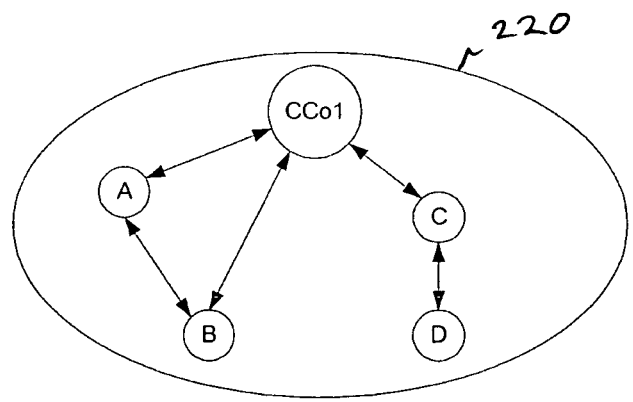
FIG. 2C illustrates a diagram of another exemplary powerline network configuration for the HPAV system in FIG. 1.

| | Physical Networks (PhyNets) in . . . | | |
|---|---|---|---|
| Station | FIG. 2A | FIG. 2B | FIG. 2C |
| A | {A, B, C, D, CCo1} | {A, B, CCo1} | {A, B, CCo1} |
| B | {A, B, C, D, CCo1} | {A, B, CCo1} | {A, B, CCo1} |
| C | {A, B, C, D, CCo1} | {C, D, CCo2} | {C, D, CCo1} |
| D | {A, B, C, D, CCo1} | {C, D, CCo2} | {C, D} |
| CCo1 | {A, B, C, D, CCo1} | {A, B, CCo1, CCo2} | {A, B, C, CCo1} |
| CCo2 | N/A | {C, D, CCo1, CCo2} | N/A |

FIG. 2B illustrates two exemplary AVLNs for HPAV system 100 in FIG. 1. As shown in FIG. 2B, AVLN 210 includes stations A and B and CCo1 and AVLN 212 includes CCo2 and stations C and D. The PhyNet for each station in FIG. 2B is shown in Table 1.

FIG. 2C illustrates an exemplary AVLN for HPAV system 100 in FIG. 1. As shown in FIG. 2C, AVLN 220 includes CCo1 and stations A, B, C, and D. The PhyNet for each station in FIG. 2C is shown in Table 1.

Figure 3:
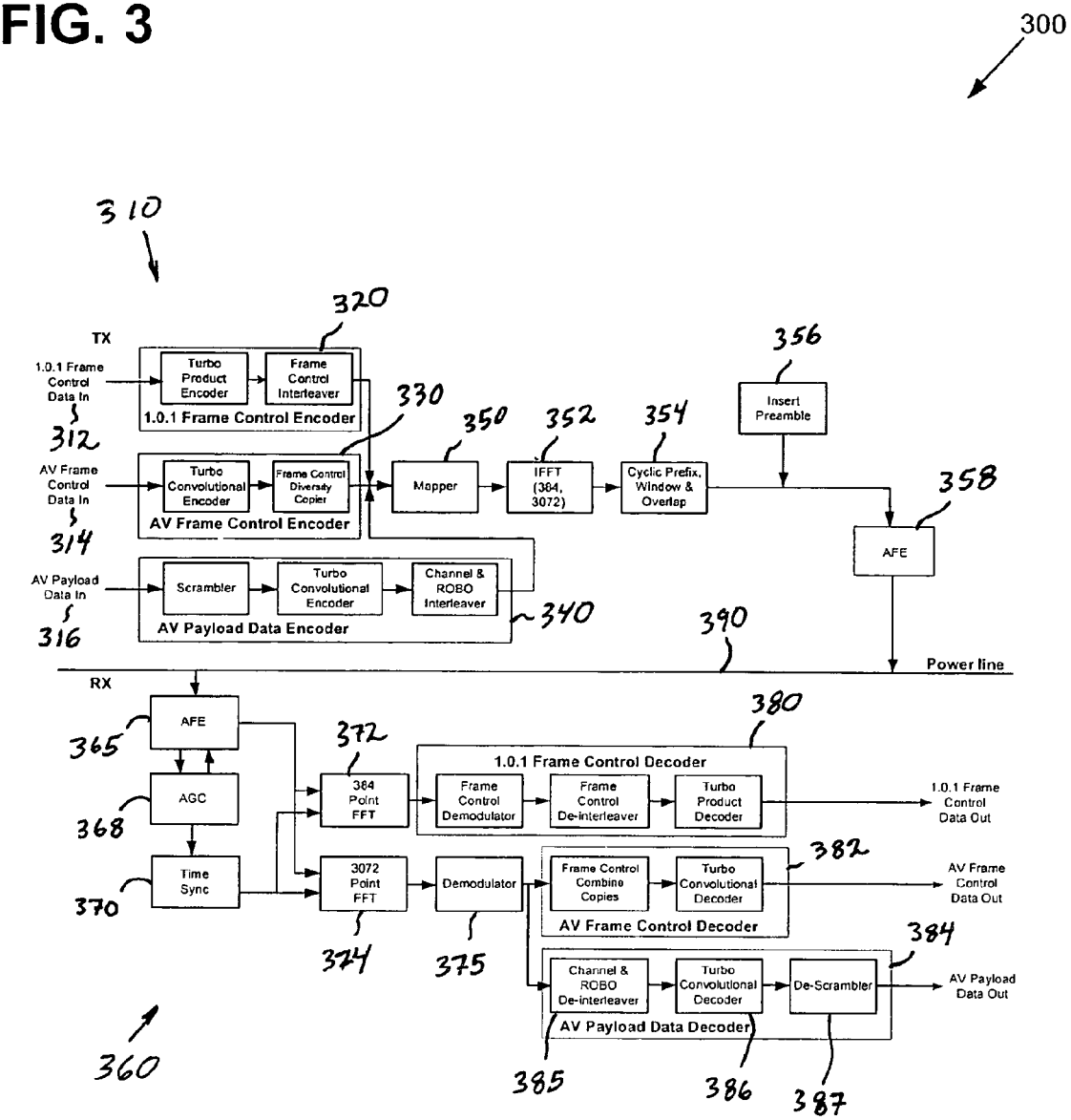
FIG. 3 illustrates a diagram of an exemplary HPAV transceiver for HPAV system 100 in FIG. 1.

FIG. 3 shows a diagram of an exemplary HPAV transceiver for HPAV system 100 in FIG. 1. HPAV transceiver 300 includes transmitter side 310, which uses OFDM modulation, and receiver side 360. On transmitter side 310, the PHY layer (e.g. PHY layer 110 in FIG. 1) receives its inputs from the MAC layer (e.g. MAC layer 120). Three separate processing chains are shown in FIG. 3 for different encoding for HomePlug 1.0.1 Frame Control (FC) data 312, HomePlug AV Frame Control data 314 and HomePlug AV Payload data 316, which are processed by 1.0.1 FC encoder 320, AV FC encoder 330 and AV payload data encoder 340, respectively. The outputs of the three encoders lead into a common OFDM modulation structure, including mapper 350, Inverse Fast Fourier Transform (IFFT) processor 352, cyclic prefix insertion, symbol window and overlap block 354, and preamble insertion 356, which eventually feeds Analog Front End (AFE) module 358 that couples the signal to power line medium 390.

At receiver side 360, AFE 365 operates with an Automatic Gain Controller (AGC) 368 and a time-synchronization module 370 to feed separate frame control and payload data recovery circuits. The frame control data is recovered by processing the received sample stream through 384-point FFT 372 for HomePlug 1.0.1 delimiters, and 3072-point FFT 374 for HomePlug AV, and through separate frame control decoders 380 and 382 for respective HomePlug 1.0.1 and HomePlug AV modes. The payload portion of the sampled time domain waveform, which contains only HomePlug AV formatted symbols, is processed through 3072-point FFT 374, demodulator 375, and through de-interleaver 385, turbo convolutional decoder 386, and de-scrambler 387 of AV payload data decoder 384 to recover the AV payload data.

In the present invention, the CCo of a network (e.g. CCo1 of AVLN 202 in FIG. 2A) transmits a special signal called the beacon, which contains system-wide information, such as the network ID, the number of neighboring networks with which it coordinates, the current schedule of transmissions (e.g. which station is allowed to transmit and when), and the mode of the network (e.g. if it is in HPAV or in HPAV Hybrid mode). The beacon can also contain responses to messages from specific stations that request resources, request to join the network, or are delivered an encryption key, etc. The beacon can be sent by the CCo at regular intervals that are tied to a specific phase of the power cycle, as discussed below in relation to FIG. 4. The beacon is transmitted in a so-called ROBO (Robust) mode, which is used for reliable reception of the beacon by other stations, where each station experiences a different channel characteristic from the CCo to the station. In the ROBO mode, modulation is independent of the characteristics of the channel, and robustness is achieved through low rate coding, low density modulation, and repetition and interleaving of the payload.

Each HPAV station (e.g. stations A, B, C, and D in FIG. 2A) monitors the channel for the presence of HP1.0 devices. When a station detects the presence of HP1.0 devices, it notifies the CCo (e.g. CC01 in FIG. 2A), which in turn switches the network (e.g. AVLN 202 in FIG. 2A) to the HPAV Hybrid mode. In the Hybrid mode operation, HPAV networks avoid interference from HP1.0 stations by coaxing the HP1.0 stations to transmit only in the CSMA/CA region of the beacon period. Thus HPAV stations and HP1.0 stations can coexist on the same medium, while HPAV stations maintain all the advantages of scheduled transmissions in the contention-free portion of the period.

Figure 4:
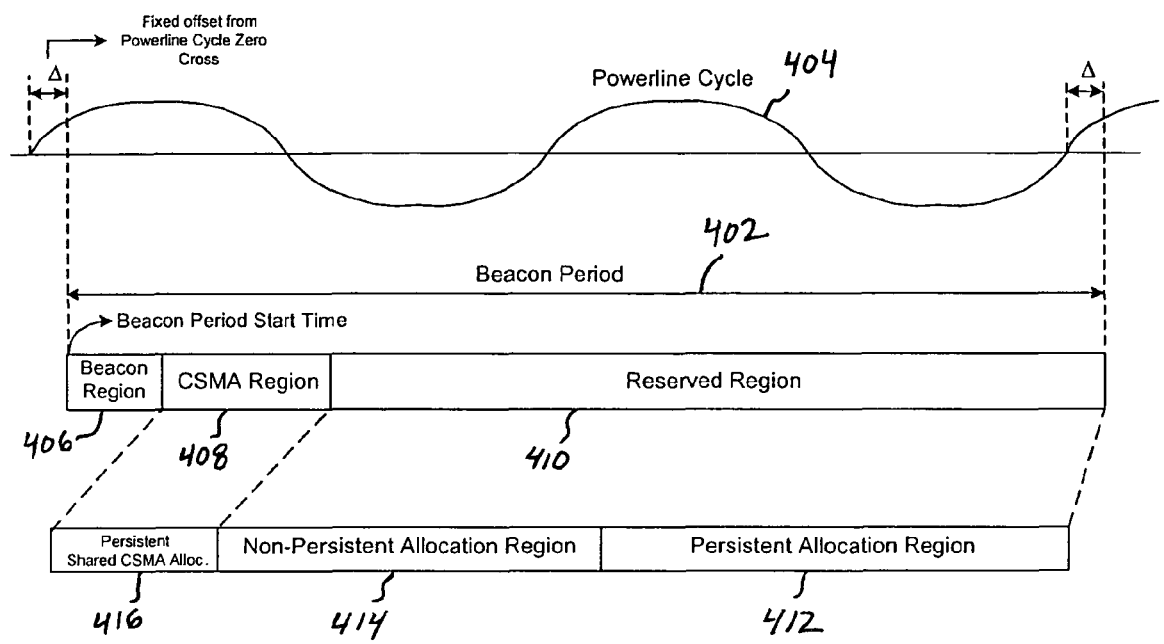
FIG. 4 illustrates a diagram of an exemplary beacon period, according to one embodiment of the present invention.

FIG. 4 illustrates an exemplary beacon period synchronized to an exemplary powerline cycle, according to one embodiment of the present invention. As shown in FIG. 4, beacon period 402 (i.e. the time between two consecutive beacon transmissions) is substantially equal to two periods of powerline cycle 404. For example, for a powerline frequency of 60 Hz (i.e. for a 60 Hz system), the beacon period is nominally equal to 33.33 milliseconds (ms). For example, for a powerline frequency of 50 Hz (i.e. for a 50 Hz system), beacon Period 402 is nominally equal to 40 ms. In one embodiment, beacon period 402 can be precisely equal to two periods of powerline cycle 404. As further shown in FIG. 4, the start of beacon period 402 can be offset from the start of a powerline cycle by a fixed duration.

As also shown in FIG. 4, beacon period 402 includes beacon region 406, CSMA (Carrier Sense Multiple Access) region 408, and reserved region 410. Beacon region 406 includes the beacon, which is generated by a CCo and can include a Preamble, a Frame Control, and a beacon payload. The CCo ensures that the beacon remains synchronized to the powerline cycle, independent of the CCo local clock frequency.

Information describing allocations within beacon period 402 is broadcast in the beacon payload by using one or more beacon Entries. Beacon region 406 also includes information regarding the duration of CSMA region 408 and reserved region 410. CSMA region 408 includes persistent shared CSMA allocation region 416, which is allocated to connections (i.e. sessions between transmitting and receiving stations) that use CSMA channel-access mechanism. CSMA region 408 is a contention period (CP) which is also known as CSMA/CA (Carrier Sense Multiple Access/contention access) period. Reserved region 410, which is the section of beacon period 402 during which only one station has permission to transmit, is further divided into persistent allocation region 412 and non-persistent allocation region 414. Persistent allocation region 412 is allocated to connections (i.e. sessions between transmitting and receiving stations), where the connections require QoS (Quality of Service). Persistent allocation region 412 is a contention free period (CFP) and can utilize TDMA (Time Division Multiple Access) channel access. Non-persistent allocation region 414 is allocated to one or more of the following:

(a) active connections that have allocation in persistent allocation region 412 but may need extra capacity, either because the channel has deteriorated for a brief or longer period of time, or because the requirements of a particular application have increased (e.g. during video or audio fast forward);

(b) an additional CSMA period (e.g. when the CCo senses high level of collisions in the regular CSMA period; and (c) special system needs, such as a discover beacon, whose purpose is to discover hidden nodes (i.e. stations) that cannot detect or hear the CCo.

In the invention's HPAV system (e.g. HPAV system 100 in FIG. 1), channel estimation is a process of measuring the characteristics of a powerline channel that is utilized to adapt the operation of the PHY (e.g. PHY layer 110 in FIG. 1) to provide optimal performance. After a station joins a powerline network, and before it (i.e. the station) engages in extensive exchange of data with other stations, the station estimates the channel between itself and the other station(s) with which it desires to communicate. As a result of channel estimation, one or more tone maps, which are lists that indicate the amount of information that can be reliably carried in different tones (portions of the spectrum), are selected for different intervals within the beacon period (e.g. beacon period 402 in FIG. 4). Often more than one tone map is needed between the same pair of stations because the channel is sufficiently different in different portions of the powerline cycle. A tone map includes a set (or list) of tones to be used on a particular unicast communication link between two stations in the powerline network. The tone map further includes a unique set of modulation methods for all of the tones in the set of tones.

Channel estimation can include selection of the modulation method(s) used on each carrier (i.e. tone), selection of the FEC (Forward Error Correction) rate, selection of the guard interval length, and selection of the intervals within the AC line cycle (i.e. the powerline cycle) where a particular tone map setting applies. The FEC rate and guard interval length can vary over the powerline cycle period, but they are the same for all carriers at any given time.

All stations in the powerline network establish a default tone map that is valid for reception by the particular station in all of the CSMA and CFP period (i.e. the whole Beacon Period a station may transmit). In addition, stations may establish AC line cycle adapted Tone Maps, i.e. Tone Maps that are valid in portion(s) of the Beacon Period and the underlying AC line cycle.

A channel estimation procedure enables a transmitting station to obtain tone maps that can be used at various intervals of the powerline cycle while communicating with a particular receiving station. Powerline channels are unique between each transmitting station and receiving station. As a result, the channel estimation procedure must be executed independently between each transmitting station and receiving station. The channel estimation procedure also includes mechanisms for negotiating the number of tone maps that can be used, maintaining lists of valid tone maps, and maintaining the lists of intervals within the powerline cycle where each tone map may be used. The channel estimation procedure can be divided into an initial channel estimation procedure and a dynamic channel adaptation procedure. The transmitting station invokes an initial channel estimation procedure when it needs to transmit data to a particular receiving station and does not have any valid tone maps.

Figure 5:
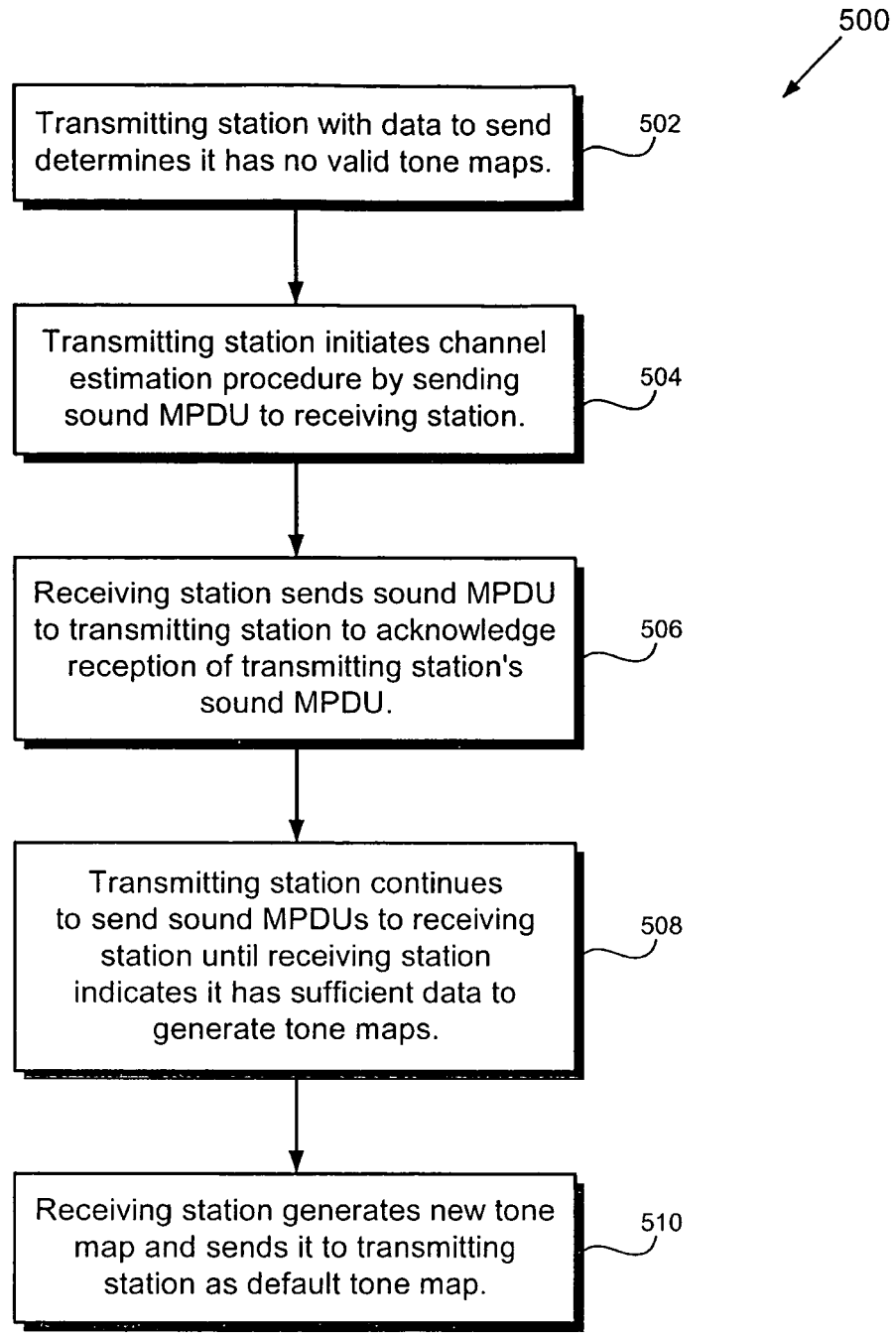
FIG. 5 illustrates a flow diagram for performing a channel estimation procedure according to one embodiment of the present invention.

Referring now to FIG. 5, there is shown exemplary flowchart 500 depicting a method for performing an initial channel estimation procedure between transmitting and receiving stations in a powerline network in accordance with one embodiment of the present invention. Certain details and features have been left out of flowchart 500 of FIG. 5 that are apparent to a person of ordinary skill in the art. For example, a step may consist of one or more sub-steps or may involve specialized equipment, as known in the art. While steps 502 through 510 shown in flowchart 500 are sufficient to describe one embodiment of the present invention, other embodiments of the invention may utilize steps different from those shown in flowchart 500.

Beginning at step 502, a transmitting station with data to send to a receiving station determines that it (i.e. the transmitting station) has no valid tone maps. At step 504, the transmitting station initiates a channel estimation procedure by sending a sound MPDU (MAC Protocol Data Unit) with SRC (Sound Reason Code) set to indicate sounding for initial channel estimation. This MPDU, which is also referred to as an "initial transmission" in the patent application, specifies the maximum number of tone maps that the transmitting station can allocate to this "link." Within the MAC, a connection is decomposed into one or more unidirectional data flows called "links." The sound MPDU is used during channel estimation to estimate the characteristics of the channel. Initial channel estimation can take place in either the CP or the CFP.

At step 506: the receiving station sends a sound MPDU with SAF (Sound ACK Flag) bit in the FC (Frame Control) field appropriately set to acknowledge reception of the sound MPDU from the transmitting station. At step 508, the transmitting station continues to send sound MPDUs to the receiving station until the receiving station indicates that it has sufficient data to generate tone maps. For example, the receiving station can send a sound MPDU to the transmitting station with the SAF and the SCF (Sound Complete Flag) appropriately set to indicate that it (i.e. the receiving station) has sufficient data to generate the tone maps. At step 510, the receiving station generates a new tone map and sends it to the transmitting station as a default tone map. The new tone map can be sent in a CEI (Channel Estimation Indication) message having a response type field that indicates that the message includes a default tone map that is generated as a result of the initial channel estimation procedure. After generating the default tone map, the receiving station can also generate one or more powerline cycle adapted tone maps.

If the initial channel estimation procedure is performed in the CP, the transmitting station must contend for the channel prior to sending sound MPDUs to the receiving station. Conducting the initial channel estimation procedure in the CP may preclude the transmitting station from transmitting sound MPDUs during certain parts of the powerline cycle. Similarly, if the initial channel estimation procedure is performed in the CFP, the transmitting station may lack sufficient allocation to span a complete powerline cycle. In either case, the receiving station is required to provide a tone map referred to as the default tone map that is valid for all portions of the beacon period (or powerline cycle).

A dynamic channel adaptation procedure can be performed by the receiving station after the initial channel estimation procedure has been performed. The dynamic channel adaptation procedure can result in dynamic updates to the default tone map (i.e. replacing an existing default tone map with a new default tone map). This procedure can also result in the generation of powerline cycle adapted tone maps that are valid at various intervals of the powerline cycle, where some of powerline cycle adapted tone maps may replace existing tone maps. In contrast to the default tone map, powerline cycle adapted tone maps are fine tuned for channel characteristics within a specific interval of the powerline cycle. Thus, a powerline cycle adapted tone map should be used by the transmitting station whenever one is available and can be used (based on the CPF field in CEI). Tone maps need to be updated and refreshed on a regular basis, otherwise they are declared as stale, and cannot be used in connections. This adaptation is needed to capture changes of the channel resulting from removal or addition of equipment in the neighborhood of the receiving or transmitting station, for example.

During a connection, the health of an active link is constantly monitored by both the receiving and transmitting stations (the transmitting station can receive feedback from the receiving station by means of the Selective ACK mechanism). When one station senses that more resources are needed to satisfy the QoS requirements of the connection, the stations can request more resources from the CCo. More resources may be needed, for example, because the channel has degraded or because the traffic presented to the transmitting station by the application has increased.

In addition to explicit requests for additional resources by the stations involved in the connection, the stations can indicate their resource needs to the CCo through special fields in the FC (Frame Control) field of each transmission. Each transmission on the channel starts with a special portion called the Frame Control (FC), which provides special information to the receiving station (e.g. what tone map is used in the modulation of the payload, or what code rate is used for error correction). One of the fields in the FC provides an indication of how many blocks are waiting for transmission in the transmitting station. If the number of blocks waiting for transmission appears excessive (i.e. if the transmitting station is suffering from congestion), the CCo, which can monitor the FC from all the transmissions in the powerline network, can allocate more resources to that connection. Additional allocations can be temporary (e.g. allocations communicated in Non-persistent allocations) to deal with short-term link degradation that results from changes in channel characteristics to which the PHY layer adapts successfully. Allocation changes can also be longer term to deal with changes in the channel to which the PHY layer cannot simply adapt, or with changes in the traffic load caused by a particular application.

Figure 6A:
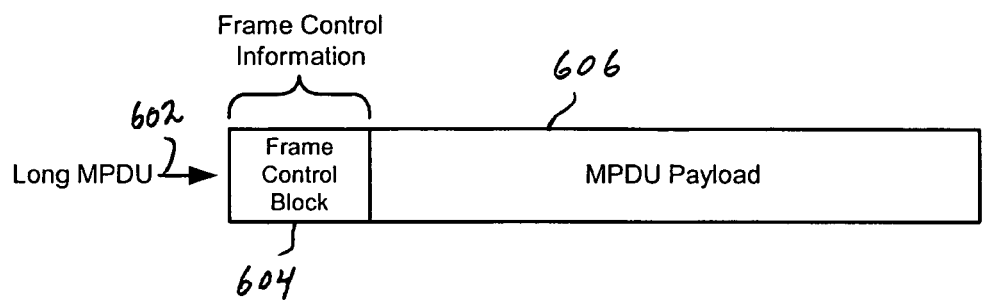
FIG. 6A illustrates a diagram of an exemplary MAC protocol data unit for HPAV system 100 in FIG. 1.

FIG. 6A illustrates an exemplary MPDU format for use by HPAV system 100 in FIG. 1. In FIG. 6A, long MPDU 602 includes frame control block 604 and MPDU payload 606. Long MPDU 602 refers to an MPDU that carries payload information in addition to frame control information and is used in AV-only mode. Frame control block 604, which can comprise 128 bits, for example, includes frame control information and MPDU payload 606 includes payload information.

Figure 6B:
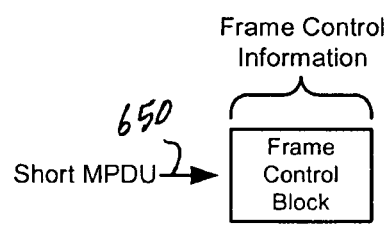
FIG. 6B illustrates a diagram of another exemplary MAC protocol data unit for HPAV system 100 in FIG. 1.

FIG. 6B illustrates an exemplary MPDU format for use by HPAV system 100 in FIG. 1. In FIG. 6B, short MPDU 650 only includes a frame control block, which includes frame control information. In short MPDU 650, the frame control block can comprise 128 bits.

Thus, as discussed above, the present invention provides an HPAV system including stations that communicate via a powerline in a powerline network, where each of the stations can be configured to generate one or more tone maps for communicating with each of the other stations, and where the tone maps indicate an amount of information that can be reliably carried in different tones. Each of the stations can be further configured to monitor its bandwidth needs and communicate its bandwidth needs to a CCo (central coordinator) for allocation of additional resources. As a result, the present invention achieves an HPAV system that advantageously provides effective bandwidth management in a powerline network environment.

From the above description of the invention it is manifest that various techniques can be used for implementing the concepts of the present invention without departing from its scope. Moreover, while the invention has been described with specific reference to certain embodiments, a person of ordinary skill in the art would recognize that changes could be made in form and detail without departing from the spirit and the scope of the invention. For example, it is contemplated that the circuitry disclosed herein can be implemented in software and/or hardware, and the software may be stored in any storage medium or memory. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A powerline network comprising:
a plurality of stations including a central coordinator for coordinating transmissions of each of said plurality of stations capable of generating beacons, wherein said beacons define beacon periods beginning at pre-defined phases of a powerline cycle and contain at least transmission schedules for at least said beacon periods;
wherein each of said plurality of stations comprises a channel estimator to generate one or more tone maps to be used on a communication link between any two of said plurality of stations, said channel estimator includes mechanisms for negotiating a number of usable tone maps, for maintaining lists of valid tone maps, and for maintaining lists of intervals within a beacon period where each tone map may be used; and
wherein each said tone map lists a set of tones to be used for a particular interval within a beacon period.

2. The powerline network of claim 1, wherein said each of said plurality of stations is further configurable to update said one or more tone maps on a regular basis to adjust to changes in said channels during said intervals of said powerline cycle.

3. The powerline network of claim 1, wherein said each of said plurality of stations is further configurable to generate a default tone map for communicating with said each other of said plurality of stations, and wherein said default tone map is valid for all portions of a powerline cycle.

4. The powerline network of claim 1, wherein said each of said plurality of stations is further configurable to monitor its bandwidth needs and to request additional bandwidth from said central coordinator.

5. The powerline network of claim 1, wherein said each of said plurality of stations is further configurable to indicate a bandwidth need in a frame control field of a transmission.

6. The powerline network of claim 1, wherein each of said one or more tone maps is valid for a specific interval of a powerline cycle.

7. The powerline network of claim 1, wherein said each of said plurality of stations is further configurable to generate a default tone map, and wherein said default tone map is further used in all of a beacon period.

8. A method for estimating a channel between two of a plurality of stations in communication in a powerline network, said method comprising:

receiving by one of said plurality of stations an initial transmission from another one of said plurality of stations;

generating one or more tone maps by a channel estimator in said one of said plurality of stations to be used on a communication link with said another one of said stations via a powerline, said channel estimator including mechanisms for negotiating a number of usable tone maps, for maintaining lists of valid tone maps, and for maintaining lists of intervals within a beacon period where each tone map may be used, said beacon period beginning at a pre-defined phase of a powerline cycle and defined by a beacon containing at least a transmission schedule for at least said beacon period; and wherein each said tone map lists a set of tones to be used for a particular interval within a beacon period.

9. The method of claim 8, further comprising updating said one or more tone maps by said one of said plurality of stations to adjust to a change in a channel during intervals of said powerline cycle.

10. The method of claim 8, wherein said one or more tone maps comprises a default tone map, and wherein said default tone map is valid for all portions of a powerline cycle.

11. The method of claim 10, wherein said two of said plurality of stations comprise a receiving station and a transmitting station, and wherein said default tone map is generated by a method comprising:

receiving by said receiving station sound data units transmitted by said transmitting station; and utilizing said sound data units by said receiving station to generate said default tone map.

12. The method of claim 11, further comprising sending by said receiving station said default tone map to said transmitting station in a channel estimation indication message.

13. The method of claim 8, further comprising:

monitoring a bandwidth need by said one of said plurality of stations, wherein said plurality of stations includes a central coordinator for coordinating transmissions of each of said plurality of stations; and requesting additional bandwidth from said central coordinator by said one of said plurality of stations.

14. The method of claim 8, further comprising:

indicating a bandwidth need in a frame control field of a transmission by said one of said plurality of stations.

15. A receiving device of a powerline network, the receiving device comprising:

a receiver configurable to receive an initial transmission from one of a plurality of stations of said powerline network; and a channel estimator configurable to generate one or more tone maps to be used on a communication link with said one of said stations, said channel estimator including mechanisms for negotiating a number of usable tone maps, for maintaining lists of valid tone maps, and for maintaining lists of intervals within a beacon period where each tone map may be used, said beacon period beginning at a pre-defined phase of a powerline cycle and defined by a beacon containing at least a transmission schedule for at least said beacon period; and wherein each said tone map lists a set of tones to be used for a particular interval within a beacon period.

16. The receiving device of claim 15, wherein said receiving device is further configurable to communicate a bandwidth need to said central coordinator in a frame control field of a transmission.

17. The receiving device of claim 15, wherein said receiving device is further configurable to generate a default tone map for communicating with said transmitting device, and wherein said default tone map is valid for all portions of a powerline cycle.

18. A method for a plurality of stations in communication in a powerline network, said method comprising:

generating beacons by a central coordinator for coordinating transmissions of each of said plurality of stations, wherein said beacons define beacon periods beginning at pre-defined phases of a powerline cycle and contain at least transmission schedules for at least said beacon period;

transmitting one or more sounding signals;

generating by a channel estimator a default tone map which is valid for all intervals within a beacon period;

estimating characteristics of a channel between any two of said plurality of stations during intervals within said beacon period using said sounding signal; and using said characteristics for generating one or more tone maps each for a specific interval within said beacon period;

wherein said channel estimator includes mechanisms for negotiating a number of usable tone maps, for maintaining lists of valid tone maps, and for maintaining lists of intervals within a beacon period where each tone map may be used.

* * * * *